Sept. 24, 1957    B. E. LUDWIG ET AL    2,807,780
POINT ALIGNER
Filed Feb. 10, 1956
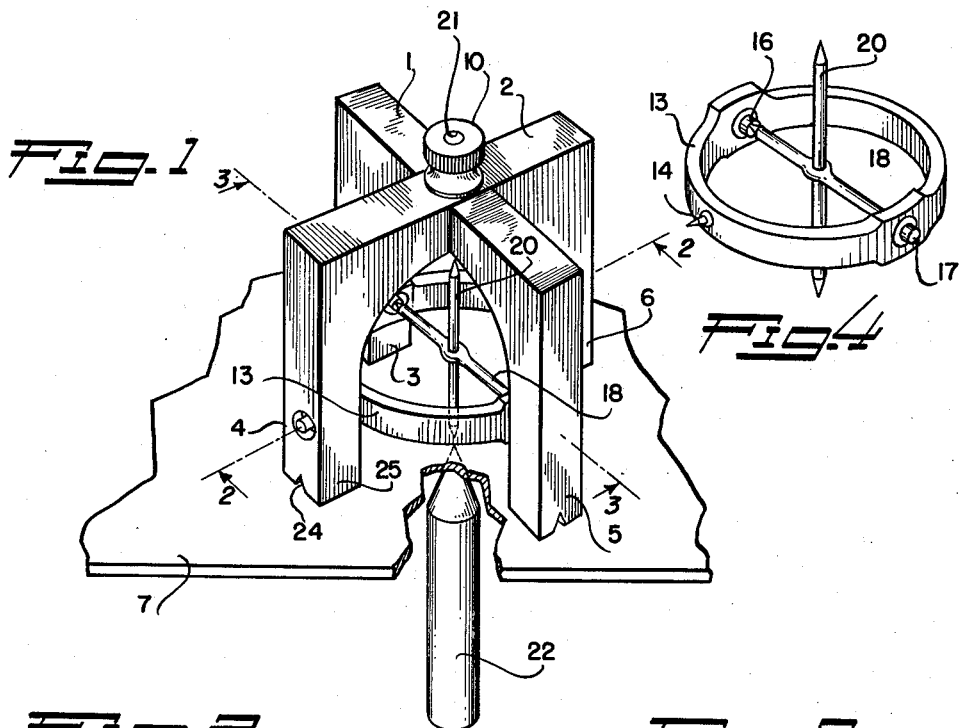
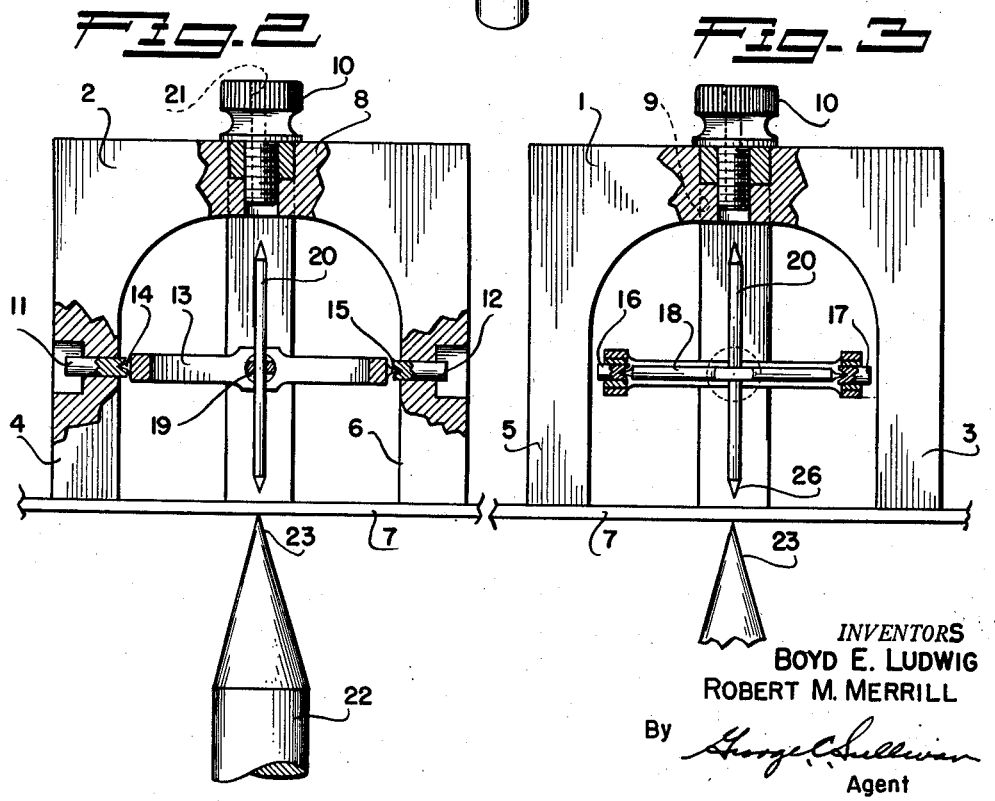
INVENTORS
BOYD E. LUDWIG
ROBERT M. MERRILL
By
Agent

United States Patent Office 2,807,780
Patented Sept. 24, 1957

2,807,780
POINT ALIGNER

Boyd E. Ludwig, Encino, and Robert M. Merrill, Pacoima, Calif., assignors to Lockheed Aircraft Corporation, Burbank, Calif.

Application February 10, 1956, Serial No. 564,828

5 Claims. (Cl. 324—67)

This invention relates to a device for accurately locating corresponding points on either side of a nonferrous wall or panel such as may be required for locating back-to-back strain gages or the like.

The conventional procedure for locating corresponding points on a wall or panel is to either drill a hole through the structure or measure from a point selected on one side of the panel to a known reference location which may be a rivet or the like which projects on either side of the panel and then scale, from the reference point, a corresponding distance on the opposite side of the panel. The first mentioned procedure of drilling a hole obviously weakens the structure and leaves a surface blemish. The second mentioned procedure does not damage the panel, however it is obviously a most inaccurate and crude way of locating corresponding points on opposite sides of such a structure.

There are of course many situations where it is desired to accurately measure corresponding points on opposite sides of a nonferrous wall or panel. For an example, in structural test work on aircraft it is general practice to employ strain gages to obtain quantitative strain measurements. To eliminate errors in the quantitative measurements and to obtain sufficient data, it is often necessary to locate the strain gages in a back-to-back relationship, that is, place one strain gage on one side of the wall or panel structure being tested and place another strain gage on the opposite side and in the corresponding location. This must be done with reasonable accuracy, and the procedures mentioned in the preceding paragraph are hardly suitable for the purpose.

Accordingly, it is an object of this invention to provide a point aligner for norferrous or nonmagnetic materials which will quickly indicate corresponding points on opposite sides of a wall or panel to an accuracy of $\frac{1}{32}$ of an inch or less on panels having a thickness of $\frac{1}{8}$ inch or less and only slightly greater errors on panels of greater thickness.

Another object of this invention is to provide a point aligner for locating corresponding points on opposite sides of a nonferrous panel or wall which is entirely mechanical in its operation and hence is relatively rugged and dependable for use in the field as well as in the laboratory.

Another object of this invention is to provide a point aligner for locating corresponding points on opposite sides of a nonferrous wall or panel which is insensitive to the forces of gravity and hence may be used with accuracy regardless of the slope of the wall or panel relative to the earth's surface.

Still another object of this invention is to provide a point aligner for locating corresponding points on opposite sides of a nonferrous wall or panel which is characterized by its small size and weight, making it a truly portable piece of equipment.

Still another object of this invention is to provide a point aligner which may be manipulated by a layman to quickly locate corresponding points on opposite sides of a wall or panel with ease and accuracy.

Further and other objects will become apparent from a reading of the following description especially when considered in combination with the accompanying drawings wherein like numerals refer to like parts.

In the drawing:

Figure 1 is a perspective view of the point aligner of this invention;

Figure 2 is a fragmentary sectional side view of the point aligner taken approximately on line 2—2 of Figure 1;

Figure 3 is a fragmentary sectional side view of the point aligner taken approximately on line 3—3 of Figure 1; and Figure 4 is a perspective view of the gimbal ring and pointer forming a part of the device.

Referring to the drawing, the point aligner includes a pair of U-shaped frame members 1 and 2 forming an open ended cage-like structure having legs 3, 4, 5 and 6 which provides a stable platform for the point aligner when the legs are seated against a nonferrous wall or panel 7. Frame members 1 and 2 as best shown in Figures 2 and 3 are provided with mating grooves 8 and 9 respectively so that the frame members may be secured together and restrained against relative movement through the use of a thumb screw 10 or the like located at the point of intersection of the frame members. As shown in the drawing, frame members 1 and 2 intersect each other at right angles. While this provides maximum stability for the point aligner frame, the U-shaped frame members may intersect at any desired angle or conceivably even a three-legged frame member may be employed rather than the four as shown in the drawing without departing from the teachings of this invention. The primary requirement of the frame member is that it provides a stable platform when seated on the panel.

One of the U-shaped frame members, for example frame member 2 as shown in the drawing, is provided with low friction bearings 11 and 12, one for each leg 4 and 6. A gimbal ring 13 is provided with shafts 14 and 15 to seatingly engage bearings 11 and 12 respectively to support the ring within the cage-like frame and permit free rotation thereof about the axis defined by bearings 11 and 12. As best shown in Figure 2, bearings 11 and 12 are of the pivot type for extremely low friction operation. The gimbal ring as best shown in Figures 3 and 4 supports a pair of low friction bearings 16 and 17, also of the pivot type, which are displaced 90° from pin shafts 14 and 15 engaging bearings 11 and 12, thus defining an axis which is normal to the axis of rotation of the gimbal ring. An axle 18 is supported by bearings 16 and 17 in ring 13 for free rotation about the axis of bearings 16 and 17. Axle 18 is provided with an opening 19 at the center thereof for receiving a ferrous or iron pointer bar 20. Pointer 20 is secured to the axle so that half the mass of the pointer is on one side of the axle and the other half of the pointer mass is on the opposite side whereby the force of gravity will not affect the aiming direction thereof. With regard to balancing, it is also important that the mass represented by axle 18 and that represented by gimbal ring 13 be distributed equally on opposite sides of the respective axes of rotation in order to avoid errors resulting from the pull of gravity in locating corresponding points on opposite sides of the wall or panel structure.

Since pointer 20 may freely rotate about two mutually perpendicular axes it may move universally. This universal motion of pointer 20 is essential to the operation of the device and for accuracy it is important that the bearing supports be such as to exert an extremely low friction force tending to resist rotation of gimbal ring 13 and axle 18. For this reason, bearings 11, 12, 16 and 17 are preferably formed of a crystal or precious stone such as a ruby, following the teachings commonly employed in providing bearings for precision instruments such as watches.

The length of pointer 20 is determined largely by the size of the frame since the pointer must be allowed its universal movement without interference by the supporting frame structure or by the wall 7 when the aligner is seated thereon as shown in the drawing.

In using the device as will be hereinafter described it is desirable to determine with reasonable accuracy the vertical position of the pointer. This may be conveniently done as indicated in the drawing by providing an opening 21 axially through thumb screw 10 at the point of intersection of the U-shaped frame members 1 and 2. By viewing through opening 21 which is substantially the same diameter as pin 20 it is easy to accurately determine when the pointer is normal to the plane of wall 7.

The point aligner device is used in cooperation with a magnetized pencil 22 having a pointed end 23. To locate corresponding points on opposite sides of a nonferrous wall or the like, magnetized pencil 22 is placed generally perpendicular to the wall with its pointed end 23 on the point to be transferred and the point aligner device is moved about on the opposite side of the wall until the iron pointer 20 is positioned normal to the plane of the wall by the magnetic forces radiating from the pencil. The pointed end 23 of the magnetic pencil concentrates the energy of the magnetic field so that iron pointer 20 will accurately follow the pointed end of the pencil with substantially no hunting action.

After locating the corresponding points it is generally necessary to mark the same for future reference. This may be accomplished in any number of ways such as for example by marking with a lead pencil. This may be facilitated by providing a small notch 24 at the base end 25 of each leg on the point aligner frame so that a mark can be made on wall 7 at each of the four notches. Then a line may be drawn through the opposite marks so that a point of intersection is obtained representing the location previously established by pointer 20.

In general the sharper the points 23 and 26 on pencil 22 and pointer 20, respectively, the more sensitive will be the device in precisely measuring corresponding points on opposite sides of the wall.

While the preferred arrangement is to have pencil 22 a permanent magnet and pointer 21 a ferromagnetic but unmagnetized material such as iron, it is obviously within the teachings of this invention to employ pointer 20 as the permanent magnet and use pencil 22 as the unmagnetized ferromagnetic element or to magnetize both pointer 20 and pencil 22. If pointer 20 is magnetized it would be highly desirable if not necessary to select materials for the frame and gimbal of the point aligner from the nonferrous, nonmagnetic group such as for example aluminum. Because pencil 22 may be conveniently made larger than the pointer with a stronger magnetic field, and because it may easily be replaced should it lose its magnetism, it is the better element to magnetize.

In use, pointer 20 of the point aligner device may become slightly magnetized by the magnetic field of the permanent magnet pencil. For this reason it is considered better design to make the point aligner frame and gimbal ring of a nonmagnetic material which cannot influence the pointer under such circumstances.

The term "wall or panel" as used herein is not intended to limit the scope of the invention, but to emphasize the fact that the device may be used on any type of structural member. The two terms are considered synonymous in the broad sense, though as commonly used they are given slightly different meanings.

While a specific embodiment of the invention is shown and described it is merely for purposes of illustration rather than limitation. Accordingly, it is to be understood that certain alterations, modifications and substitutions may be made to the instant disclosure without departing from the spirit and scope of the invention as defined by the appended claims.

We claim:

1. A point aligner device for locating corresponding points on opposite sides of a nonferrous panel or the like comprising, a plurality of spaced leg members joined together at one end to form an open ended cage-like frame arranged to seat on the panel, a gimbal ring rotatably carried by the frame within said cage for movement about an axis transversely of the axis defined by the legs, an axle carried by said gimbal ring for free rotation about an axis normal to the axis of rotation of the gimbal ring, and a ferrous metal pointer bar secured to said axle intermediate of the ends thereof and transversely of the axis of axle rotation whereby the pointer bar may move universally under the influence of a magnetic field to aim at a known point on the opposite side of the panel, at least two of the legs on said frame having guide means formed thereon to facilitate marking the panel and accurately indicating the position of the point aligner.

2. A point aligner device for locating corresponding points on opposite sides of a nonferrous panel or the like comprising, a plurality of spaced leg members joined together at one end to form an open ended cage-like frame arranged to seat on the panel, a gimbal ring rotatably carried by the frame within said cage for movement about an axis transversely of the axis defined by the legs, an axle carried by said gimbal ring for free rotation about an axis normal to the axis of rotation of the gimbal ring, and a ferrous metal pointer bar secured to said axle intermediate of the ends thereof and transversely of the axis of axle rotation whereby the pointer bar may move universally under the influence of a magnetic field to aim at a known point on the opposite side of the panel, said gimbal ring, axle and pointer bar being balanced to eliminate the pull of gravity on pointer movement, at least two of the legs on said frame having guide means formed therein to facilitate marking the panel and accurately indicating the position of the point aligner.

3. A point aligner device for use in conjunction with a ferrous metal pencil to locate corresponding points on opposite sides of a nonferrous panel or the like comprising, a pair of generally U-shaped members joined at their apexes to form an open ended cage-like frame having legs arranged to seat on the panel, a gimbal ring rotatably carried by the cage-like frame for free movement about an axis normal to the legs, an axle carried by said gimbal ring for free rotation about an axis normal to the axis of rotation of the gimbal ring, and a ferrous metal pointer bar secured to said axle and extending transversely of the axis thereof whereby the pointer bar may move universally to aim at the pencil by magnetic attraction, said pointer bar having a pointed end for increasing sensitivity and reducing any tendency to hunt.

4. A point aligner device for use in conjunction with a ferrous metal pencil to locate corresponding points an opposite sides of a nonferrous panel or the like comprising, a pair of generally U-shaped members joined at their apexes to form an open ended cage-like frame having legs arranged to seat on the panel, a gimbal ring rotatably carried by the cage-like frame for free movement about an axis normal to the legs, an axle carried by said gimbal ring for free rotation about an axis normal to the axis of rotation of the gimbal ring, and a ferrous metal pointer bar secured to said axle and extending transversely of the axis thereof whereby the pointer bar may move universally to aim at the pencil by magnetic attraction.

5. A point aligner device for use in conjunction with a ferrous metal pencil to locate corresponding points on opposite sides of a nonferrous panel or the like comprising, a pair of generally U-shaped members jointed at their apexes to form an open ended cage-like frame having legs arranged to seat on the panel, a gimbal ring rotatably carried by the cage-like frame for free movement about an axis normal to the legs, an axle carried by said gimbal ring for free rotation about an axis normal to the axis of rotation of the gimbal ring, and a ferrous metal pointer bar secured to said axle and extending transversely of the axis thereof whereby the pointer bar may move universally to aim at the pencil by magnetic attraction, said pointer bar having a pointed end for increasing sensitivity and reducing any tendency to hunt, and said frame having an opening formed therethrough at its apex, said opening being npproximately the same diameter as said pointer rod and arranged for alignment therewith in one position of the pointer rod to accurately determine when the rod is properly aimed.

References Cited in the file of this patent

UNITED STATES PATENTS

| | | |
|---|---|---|
| 2,346,773 | McBride et al. | Apr. 18, 1944 |
| 2,596,638 | Arvela | May 13, 1952 |
| 2,600,857 | De La Mater | June 17, 1952 |